United States Patent
Pringiers

(10) Patent No.: US 7,258,405 B2
(45) Date of Patent: Aug. 21, 2007

(54) TIRE TRACK

(75) Inventor: Koenraad Pringiers, Colombo 5 (LK)

(73) Assignee: TWECO, Ghent (BE)

( * ) Notice: Subject to any disclaimer, the term of this patent is extended or adjusted under 35 U.S.C. 154(b) by 0 days.

(21) Appl. No.: 11/074,433

(22) Filed: Mar. 8, 2005

(65) Prior Publication Data

US 2005/0212359 A1  Sep. 29, 2005

Related U.S. Application Data

(63) Continuation-in-part of application No. 10/615,070, filed on Jul. 8, 2003, now abandoned.

(30) Foreign Application Priority Data

Jul. 10, 2002  (EP) .................................. 02447130

(51) Int. Cl.
*B52D 55/04* (2006.01)

(52) U.S. Cl. ........................ 305/193; 305/15; 305/165; 305/183; 305/184

(58) Field of Classification Search ................... 305/15, 305/19, 157, 158, 159, 160, 165, 167, 170, 305/178, 182, 183, 193, 194, 195, 184; 152/185.1, 152/220
See application file for complete search history.

(56) References Cited

U.S. PATENT DOCUMENTS

| | | | | |
|---|---|---|---|---|
| 2,046,299 A | * | 6/1936 | Armington ................... | 152/182 |
| 2,532,824 A | * | 12/1950 | Sinclair ....................... | 305/193 |
| 2,560,307 A | * | 7/1951 | Slemmons ................... | 305/110 |
| 3,161,443 A | * | 12/1964 | Svensson .................... | 305/112 |

(Continued)

FOREIGN PATENT DOCUMENTS

DE  9302375.8  2/1993

(Continued)

*Primary Examiner*—Russell D. Stormer
(74) *Attorney, Agent, or Firm*—Frommer Lawrence & Haug LLP

(57) ABSTRACT

A unitary flexible track for converting a wheeled vehicle into a tracked vehicle, the track being provided for mounting in longitudinal direction around at least two successive vehicle tire-wheel assemblies in movement direction of the vehicle, the track having an inner circumferential track surface provided to form a running surface for the wheels and an outer circumferential surface provided to form a running surface for the track with respect to the medium over which the track is to be displaced, each tire-wheel assembly having a circumferential running surface provided to contact the inner circumferential track surface of the track, each tire-wheel assembly comprising a loaded wheel part and a non-loaded wheel part. The track comprises a plurality of spaced apart guiding wings disposed along opposite longitudinal sides of the track and protruding inwardly from the inner surface of the track so as to form on the track an inner circumferential channel for receiving the tire-wheel assemblies, the guiding wings engaging opposite lateral sides of the loaded part of the tire-wheel assembly and to exert a clamping force thereto in cross direction of the track and the tire-wheel assembly to transfer a driving force between the tire-wheel assembly and the track, opposite guiding wings being positioned at a distance from each other which is smaller than the width of the tire-wheel assembly when loaded and which is larger than the width of the tire-wheel assembly when not loaded.

24 Claims, 10 Drawing Sheets

U.S. PATENT DOCUMENTS

| | | | | |
|---|---|---|---|---|
| 4,362,340 A | * | 12/1982 | van der Lely | 305/151 |
| 4,408,646 A | * | 10/1983 | Forsyth | 152/179 |
| 4,810,043 A | * | 3/1989 | McIntosh | 305/15 |
| 4,842,346 A | * | 6/1989 | Schlegl | 305/183 |
| 4,848,430 A | | 7/1989 | Lenet | |
| 4,953,920 A | * | 9/1990 | Jager | 305/182 |
| 5,020,865 A | * | 6/1991 | Edwards et al. | 305/182 |
| 5,044,415 A | * | 9/1991 | Ishihara | 152/228 |
| 5,429,429 A | * | 7/1995 | Loegering et al. | 305/193 |
| 5,632,537 A | * | 5/1997 | Yoshimura et al. | 305/173 |
| 6,478,389 B2 | * | 11/2002 | Doyle | 305/187 |

FOREIGN PATENT DOCUMENTS

| | | |
|---|---|---|
| GB | 2 077 203 | 12/1981 |
| GB | 2 104 015 | 3/1983 |
| JP | 62-289480 | 12/1987 |
| NL | 7605810 | 5/1976 |

* cited by examiner

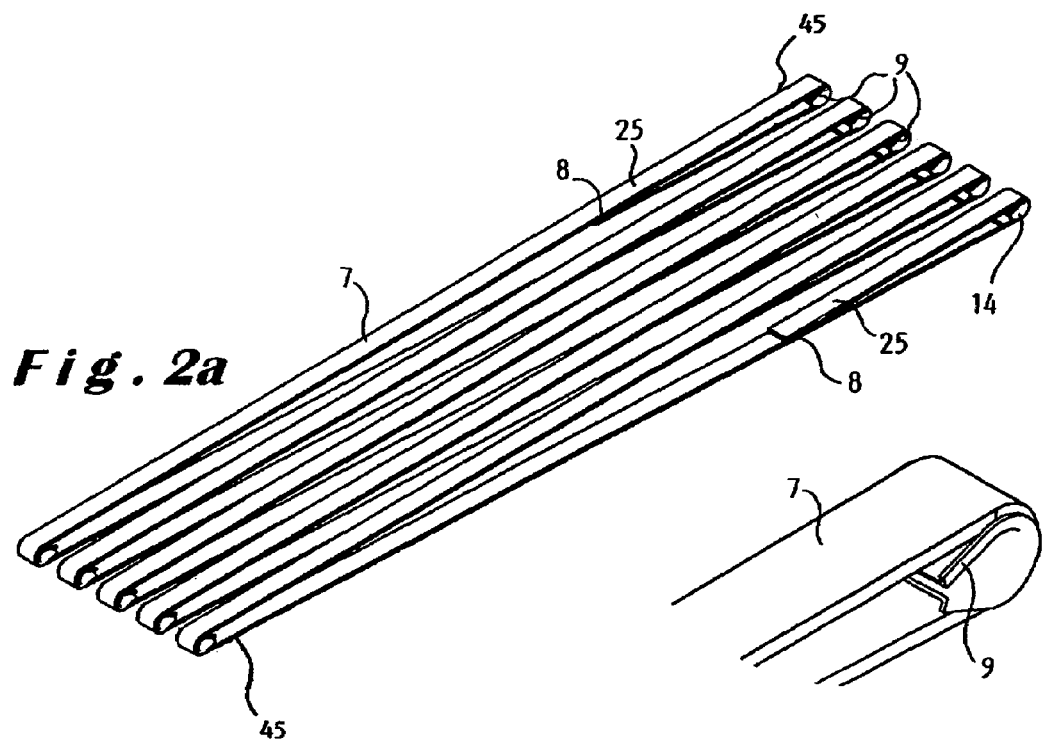
*Fig. 2a*
*Fig. 2b*
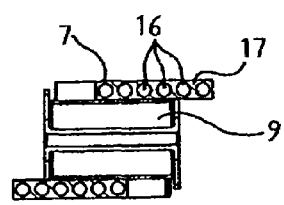
*Fig. 2c*

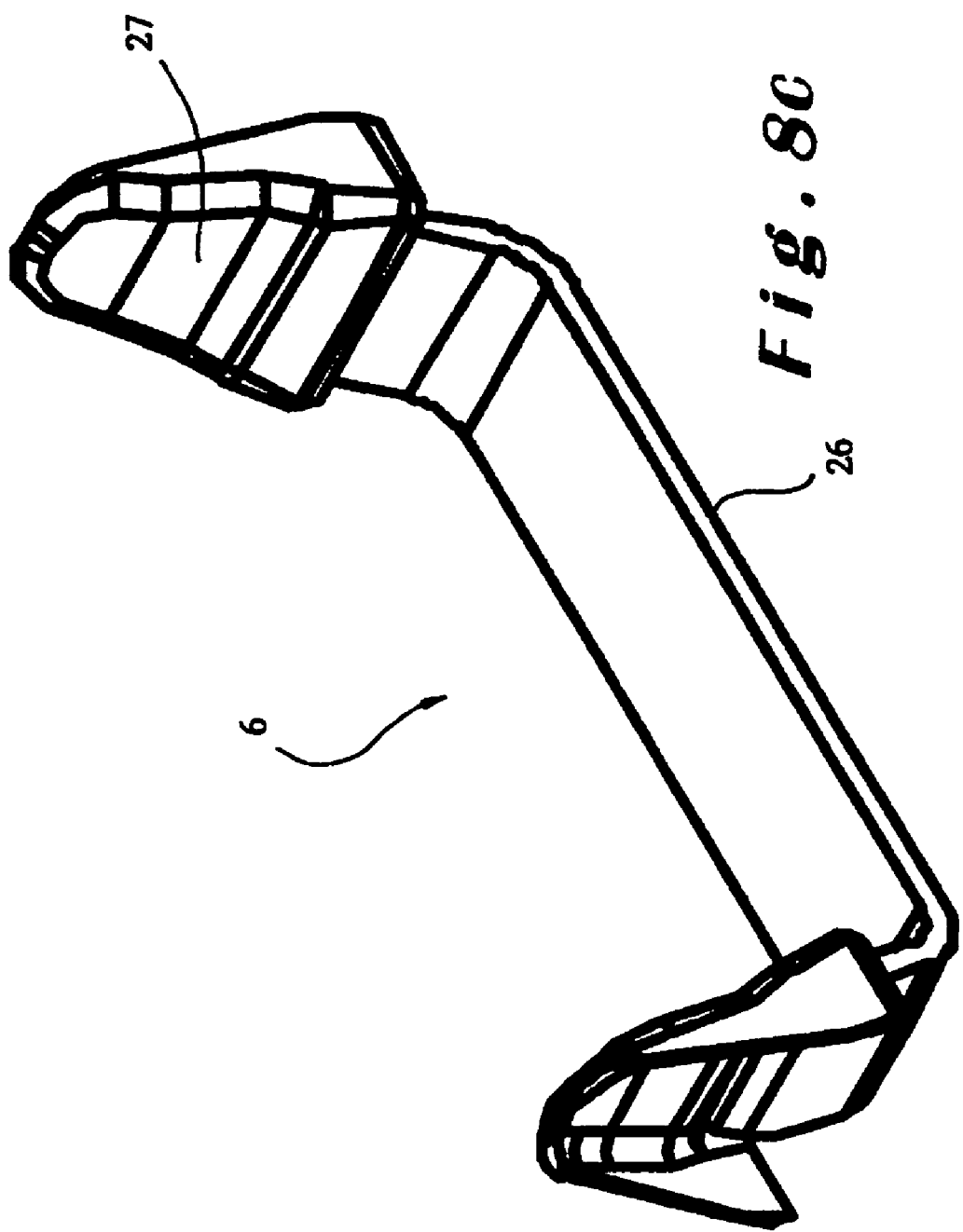

TIRE TRACK

CROSS-REFERENCE TO RELATED APPLICATIONS/INCORPORATION BY REFERENCE

This application is a continuation-in-part of U.S. patent application Ser. No. 10/615,070, filed on Jul. 8, 2003 now abandoned, which claims the priority benefits of European Patent Application No. 02447130.2, filed on Jul. 10, 2002.

FIELD OF THE INVENTION

The present invention relates to a monolithic flexible track for converting a wheeled vehicle into a tracked vehicle as disclosed in the preamble of the first claim. The term monolithic is used herein as opposed to a track composed of a plurality of connected rigid elements extending in cross direction of the length of the track, wherein the rigid elements may be embedded in a rubber phase or not.

BACKGROUND

In the past, a vast number of solutions have been proposed for converting a wheeled vehicle into a tracked vehicle. According to one of these solutions a monolithic flexible track is installed around a pair of wheels remote from each other on the same side of a vehicle, at least one of the wheels being a driven wheel. To prevent elongation of the track during use, the track is reinforced in longitudinal direction, for example by one or more steel or textile fibers or cords.

GB-A-2.104.015 discloses a flexible endless track, which is made of an elastomeric material reinforced with nylon or steel filamentary material in the form of a continuous cord wound across the width of the track in a plurality of side-by-side turns. As this track is endless, continuous, the tires of the wheels need to be deflated when mounting or the track around them or removing the track. This operation is complicated and time consuming.

Another solution for adapting a wheeled truck having the wheels arranged in two adjacent sets to agricultural purposes and to make it suitable for traveling with heavy loads on weak soil has been proposed by U.S. Pat. No. 4,362,340. According to U.S. Pat. No. 4,362,340 an endless tread type track is mounted around a pair of consecutive tires. The track is made of a flexible material, for example a synthetic resin or rubber-like material and contains one or more canvas or nylon liners. The track may either be built up of a single part both ends of which are interconnected when mounted to a vehicle to form an endless belt, or of two or more parts, which are connected to each other by two or more joints. On the side of the belt facing the tires, a plurality of cams or teeth having the shape of a truncated pyramid is present. The cams or teeth are held in a clamping fit between two adjacent tires.

An analysis of the problems arising with the above-described type of tracks has revealed that they are driven by a circumferential traction exerted by the wheels to the track. To provide good transfer of the traction forces, the track needs to be tensioned around the wheels. However, tension has been found to decrease during use of the track. Besides this, the traction provided by the cams positioned between the adjacent tires appears to be insufficient, slipping at the front side of the vehicle being the result.

In DE-U-9302375.8 a flexible belt for use as a track is disclosed, which solves the problem of minimizing the risk to elongation following use, as this adversely affects the contact between the track and it's driving. The flexible belt disclosed in DE-U-9302375.8 is provided to be used as such; there is no teaching to use this belt in combination with a wheeled vehicle. The belt disclosed in DE-U-9302375.8 comprises a plurality of parallel bands connected to each other in cross direction of the track, each band being internally reinforced by a plurality of metal cords. The coupling of parallel bands in cross direction of the truck is achieved by means of a plurality of U-shaped profiles, each U-profile being received in corresponding recesses in the parallel bands. Each band has an opposite first and second end part. Each end part contains a central coupling hole for coupling the first end part to the second end part in longitudinal direction of the track, a reinforcing cord extending as a loop around the coupling hole.

U.S. Pat. No. 3,161,443 discloses a positive drive tractor track adapted to be stretched about the outside surface of consecutive tractor wheels, one of them having a larger size, one of them having and a smaller size. Soil engagement of the outer surface of the track is improved by the presence of transversally extending ribs reinforced with rods. The rods are connected to each other in longitudinal direction by means of longitudinally extending steel wires, which also function as track absorbing members. The track is driven and held firmly on both wheels by means of projections along the longitudinal track edges, which are provided to engage between the ribs sideways of the tires. The projections extend in steps of different height to render them suitable for use with wheels of different size. Both end parts of the track are joined by means of joining lugs. However, the ability of the track to deform in longitudinal direction and to adapt itself to varying dimensions of the wheels is limited, thus leading to poor circumferential traction. Besides this, the track shows a serious risk to slipping at large powers in which case there is no engagement of the protrusions and no driving of the track. Also the track is subject to vibrations as the inwardly projections engage between the ribs. The track disclosed in U.S. Pat. No. 3,161,443 is not suitable for use with small wheels as in that case the number of contact points between the track and wheels is insufficient.

U.S. Pat. No. 2,560,307 discloses an endless track assembly extending about spaced-apart pulleys, which solves the problem of improving mud removal from the space between the pulley and the track. Thereto the inner surface of the track is provided with a pair of circumferentially extending longitudinal ribs with a continuous valley-like depression between them engageable with circumferential rims on opposite sides of the pulley. The resilient rubber material at the pulley-contacting surface of the track accommodates variations in the surfaces of the rim, to improve the grip on the pulley for effective driving action. Transmission of traction force with minimum slippage between the track and the soil is obtained by the presence of corrugations on the ground-contacting surface of the track. The sliding and contacting movement of the ribs across the inclined portions of the corresponding rim on the pulley scrapes the exposed working surfaces substantially free of mud. The pressing action of the bottom wall of the valley like depression tends to squeeze the mud from between the adjacent faces of the band and the pulley and to shift the mud to the peripheral groove which accommodates the mud and permits it to travel with the pulley to an upper region of the pulley, thereby facilitating frictional engagement between the peripheral contacting surfaces of the band and pulley at each side of the groove for effective traction purposes.

SUMMARY OF THE INVENTION

There is thus a need to a track which is suitable for converting a wheeled vehicle into a tracked vehicle, which is removable mountable to the wheels of the vehicle, in which there is optimum transfer of driving or traction forces between the wheels and the track independent of the life time of the track or vehicle or the time the track has been used with the vehicle, and which shows a reduced risk to the occurrence of vibrations.

It is therefore the aim of the present invention to provide a flexible track for converting a wheeled vehicle into a tracked vehicle, in which an optimized transfer of driving forces from the vehicle to the flexible track may be achieved in a wide variety of circumstances, independent of the life time of the track or vehicle or the time the track has been used with the vehicle.

This is achieved according to the present invention with a flexible track showing the technical features of the characterizing part of the first claim.

Thereto, the flexible track of the present invention is characterized in that it comprises a plurality of spaced apart guiding wings which are disposed along opposite longitudinal sides of the track and which protrude from the inner surface of the track so as to form an inner circumferential channel within the space enclosed by the track, the channel being provided to receive the wheels in it, the guiding wings being provided to engage opposite lateral sides of the loaded wheel part and to exert a clamping force thereto in cross direction of the wheels and track with the aim of transferring a driving force from the wheels to the track or the reverse, opposite guiding wings being positioned at a distance from each other which is smaller than the width of the wheels when resting on a support surface and which is larger than the width of the wheels when not resting on a support surface.

When analyzing the problems arising with existing tracks, the inventors have found that the part of the tires of a wheeled vehicle resting on a support surface or in other words the loaded part of the tires undergo deformation, in particular when loaded. Thereby the inventors have observed that the side wall of the tire expands or bulges out, in particular the side wall of that the part of the tires in the vicinity of the contact surface with the track, expansion increasing when moving from the center of the wheel towards the running surface.

By receiving the wheels within a channel having a width that is larger than the width of the non-loaded part of the tire-wheel assembly which will mostly be the top side of the tire-wheel assembly, positioning of the wheels within the inner circumferential channel of the track is facilitated and the natural expansion of the loaded part of the tire resting on a support surface is made possible.

Transfer of driving forces between the wheels and the track is established by the fact that the channel has a width which is smaller than the width of the wheels when loaded or resting on the support surface, and by the fact that the guiding wings positioned on opposite sides of the channel engage and exert a clamping force to opposite sides of the wheels in cross or width direction of the wheels. The smaller width of the channel contributes to the frictional clamping of part of the tire-wheel assemblies between the guiding wings. The clamping action in cross direction of the wheels ensures an improved grip of the track to the wheels and a consequently reduced risk to slipping of the wheels with respect to the track. With the present invention a self-regulating system is provided, according to which a higher load results in a more significant bulging and thus a better traction. Moreover, the grip by track to the wheels has been found to be independent of any circumferential tension to which the track is subjected.

The clamping force exerted by guiding wings positioned on opposite sides of the track in cross direction of the wheels permits to achieve optimum transfer of traction forces between wheels and track independently of the presence or absence of any circumferential tension to which the track would be subjected. This is important as it permits achieving optimum transfer of traction forces even with varying dimensions of the tire-wheel assemblies of wheeled vehicles, without the need to repeatedly adjust the circumferential tension of the track. The inventors have namely found that the dimensions of the tires vary during use and in the lifetime of a vehicle. In particular the dimensions of the tires have been found to vary with a.o. wearing of the tires, the traveling speed, the tire pressure, the load to which the tires are subjected etc. The absence of the need to subject the tire-wheel assembly to a circumferential tension exerted by the track allows to reduce the loads exerted to the parts connecting the end parts of the track and thus to reduce the risk to a break down thereof, the traction transfer being virtually independent of the circumferential tension to which the track is subjected. Thus, a track is provided in which optimum transfer of driving forces may be achieved even with varying dimensions of the wheels when in use, while contact pressure distribution is optimized, the track being easy to fit around the wheels.

Driving of the track by transferring traction between the wheels and the track through clamping forces exerted in a direction virtually perpendicular to the direction in which the track is displaced, in particular in cross direction of the wheels around which the track is mounted, has been found to result in a reduced sensitivity of the driving of the vehicle to wearing as well as a reduced risk to wearing of the running surface of the tires. This reduced risk to wearing may be further improved by optimizing the contact surface between the tire-wheel assembly and the inner surface of the track. The clamping in a direction virtually perpendicular to the direction in which the track is displaced has further been found to involve a reduced risk to slipping of the wheels with respect to the track, even in case little or no circumferential tension is exerted by the track, where the track showed some sagging, as well as in severe circumstances with heavy grounds. The inventors have also observed that the clamping force which is exerted by the guiding wings in cross direction of the wheels counteracts de-tracking of the track from the wheels even when driving the track in extreme conditions. The optimized contact surface between the tire-wheel assembly and the track has been found to contribute to this effect. Also the lower pre-tension of the track involves a reduced energy consumption, while forces exerted to the axles of the vehicle may also be reduced.

The use of a continuous track has been found to contribute to decreasing the pressure exerted by the vehicle to the ground over which the vehicle is displaced, in a more or less uniform manner. As a consequence, the risk to the occurrence of a too high local pressure exerted by the vehicle may also be minimized. Furthermore, an improved contact with the ground surface and an improved contact floor pressure have been observed, especially in case rubber tracks are used which are substantially free of holes. These improvements are important as the tracks of this invention are meant to be used on muddy grounds, where there is a risk to sinking into the ground when loaded, on sandy grounds, on steep slopes or on rocky surfaces. Besides being capable of moving over such grounds, the vehicle must further be capable of picking up, moving and carrying loads. These actions put high demands to the ground pressure exerted by the vehicle. It has been observed that when using a vehicle having the track of this invention mounted to the wheels, there is a strongly reduced risk to toppling over of the vehicle during use.

The flexible track of this invention shows a minimized risk to the occurrence of unwanted vibrations and a minimized risk to slipping of the track, even if the track does not fit tightly around the wheels, but rather extends loosely around them.

Within the scope of the present invention it is preferred that the angle between the clamping forces by the guiding wings and the direction in which wheels and track are to be displaced, is virtually perpendicular, although this may be somewhat higher or lower than 90°. The clamping forces may for example extend under an angle which takes any value between 60° and 90°, or any value between 90° and 120°.

It is preferred that the guiding wings show a good rigidity combined with some resilience, as this facilitates inserting the wheels in the channel and renders the use of the track less dependent from the width of the wheels. Rigidity is provided by the presence of a reinforcing rigid core in at least part of the guiding wings.

The rigid core is preferably composed of a first portion extending transversally of the track, and two other portions extending upright from the transversal portion. Thereby the angle between the first transversal portion and the upright portions will generally be about perpendicular, in general somewhat larger than 90° to permit expansion of the tires.

The presence of the rigid core reduces the risk to flexion of the guiding wings in width direction of the track, thus increasing friction forces between the wheels and the guiding wings as the wheels expand when loaded. Preferably however, the rigid core may flex somewhat with respect to the band, to provide the possibility of accommodating in the track various types and sizes of wheels and to reduce wearing of the wheels by the guiding wings. Preferred materials for the rigid core providing an optimum compromise between sufficient rigidity and permitting some flexing are fibrous reinforced composite materials, steel or spring steel. Suitable fibrous reinforcing materials include glass fibers, carbon fibers, synthetic fibers such as aramid fibers, metal fibers or any other suitable fibers known to the person skilled in the art. Preferably however spring steel is used as it combines good rigidity with sufficient resiliency and returning to its original shape after having been stretched.

To further improve the grip of the track to the wheels, in a preferred embodiment of this invention the inner side of at least part of the guiding wings facing the wheels may be provided with at least one profile which protrudes from the inner side of the guiding wing towards the wheels.

Furthermore, preferably at least part of the outer side of the guiding wings is provided with profiles protruding from the outer side in order to improve grip of the track to the ground.

The rigid core of the guiding wings can be encapsulated in the same flexible material as the material of which the track is made, or of a different material. Preferably however there are made of the same material.

A further improvement of traction transmission efficiency between the wheels and track is achieved if the inner face of the track or band aimed at contacting the wheels is provided with traction ribs. The traction ribs are disposed so as to allow engagement of corresponding recesses present on the running surface of the vehicle wheels, and to minimize the risk to unwanted slipping of the wheels on the track occurs. As a result of the traction ribs engaging the running surface of the tire-wheel assembly, the need to circumferential tension exerted by the track to the wheels can be further reduced, which is beneficial to the transmission of the power of the engine on the ground through the tracked wheels, even in case of sagging of the track. The number and shape of the traction ribs and the nature of the engagement aimed at will be adapted by the man skilled in the art to the circumstances in which the track is to be used. It is generally advised to allow some slipping of the wheels with respect to the track; especially when with heavy grounds the power needed to drive the vehicle would become higher than the motor power. In that way the driver is in a position to balance between the available power of the device and the power needed to move the device.

If it is preferred to reduce heat built up between the contact surface of the guiding wings and the wheels to a minimum and to minimize the risk to wearing thereof, at least part of the guiding wings, in particular a top part of the guiding wings is coated with a low friction material. Suitable examples of low friction material include a plastic material or a steel variety. The top part of the guiding wings can either be made entirely of this low friction material or only be coated with a layer of the low friction material.

Instead of or in addition to traction ribs, a plurality of protrusions may be provided on the inner circumferential surface of the track. The number, shape and pattern in which the protrusions are arranged will be adapted by the person skilled in the art to achieve optimum engagement of the wheels.

According to another preferred embodiment, the track of this invention comprises connectable end parts, to ensure an easy mounting of the track around consecutive wheels. The flexibility and pliability of the track may be improved by allowing the track to flex at the position where the first and second end part are connected to each other. This is achieved by having the first and second end part of the band hingingly connectable to each other.

Furthermore, to improve the strength of the track, preferably at least one flexible elongated reinforcing element is embedded in the band. This at least one reinforcing element extends along the length of the said band and forms a loop around the hole or holes provided at the position of each of the first and second end part of the band.

In the flexible track of this invention, each reinforcing element comprises a first and a second end part, each of the end parts being secured to the reinforcing element to form a loop. The presence of the loops provides an additional reinforcement of the end parts of the track and has the effect that the tension forces endured at the connection of the two end parts of the track in operation may be absorbed by the flexible elongated reinforcing element. This permits reducing the risk to the formation of cracks in the elastomeric band at the sides of the passage receiving the connecting means for the two end parts. In the track of this invention the loops extend in longitudinal direction of the track, whereby a distance exists between adjacent reinforcing elements. These technical features permit increasing the longitudinal moment of inertia, as a consequence of which a higher bending resistance in longitudinal direction of the track may be achieved, which in turn involves a more uniform distribution of the ground pressure exerted by the track.

Suitably, the track comprises opposed first and second lateral longitudinal sides and each reinforcing element extends continuously from one longitudinal side of the said band to the opposite longitudinal side of the band in making alternate loops around each hole of each of the first and second end parts of the band. This configuration provides the track with a homogeneous traction resistance, especially at its end parts, since each passage for receiving connecting means for connecting the end parts of the track, will be properly reinforced.

The shape of the reinforcing element is not critical to the invention and will be adapted by the person skilled in the art depending on the intended use. It may however be preferred to use a reinforcing element comprising at least one metal or textile cord or strip, as these materials show a high tension resistance and a high flexibility. More preferably, the reinforcing element is composed of a steel cord strip embedded in an elastomeric material coating; or a plurality of adjacent steel cords embedded in the elastomeric material coating.

In a preferred embodiment of the invention, the first and second end parts of the band are provided with alternating extensions and recesses, each extension being provided with at least one hole. Each extension of the first end part is provided to engage a corresponding recess of the second end part, each extension of the second end part is provided to engage a corresponding recess of the first end part. In that way, at the position where the first and second end part engage each other, a channel of successive holes is formed for receiving the connecting means for connecting the first and second end parts of the band. This embodiment provides a very simple means for connecting the end parts of the band affords a strong bonding of the end parts to each other and provides in an outstanding continuity of the track once mounted on wheels of a vehicle. An optimum of the amount of alternating extensions and recessions can be determined by the man skilled in the art and is related to the strength of the reinforcing element and the diameter of the connecting rod.

The size of the connecting means is preferably selected such that it corresponds to the formula:

$$d \geq \sqrt{(6/\pi * \{(x*y)*F_{breaking}\}/\{(x-1)*\sigma 0.2\})}$$

in which

| | |
|---|---|
| $F_{breaking}$ = | breaking load of longitudinal reinforcing element (7) i.e. steel cord, textile, fiber, . . . (16) measured per separate cable, literature values) |
| x = | the number of loops of reinforcing element (7) |
| y = | cables/section (FIG. 2c) the ratio between the number of and the cable |
| $\sigma$ 0.2 = | tensile strength of the connecting means (13) |
| $\tau$ max = | ⅓ $\sigma$ 0.2 (see literature) |
| d = | diameter of the connecting means (13) |
| $\tau$ = | $\{(x/2 * y) * F_{breaking}\}/\{(x - 1) * \pi * d^2/4\}$ |
| $\tau \leq \tau$ max | |
| $\tau \leq$ ⅓ $\sigma$ 0.2 | |

In practice, for example the value of the above mentioned parameters might be as follows:

| | | |
|---|---|---|
| F | 6700 N | |
| x | 11 | |
| y | 6 | |
| SIGMA | 470 N/MM² | (STAINLESS) |
| D | 12,78423952 | |

With the above described technical features a substantially monolithic flexible track may be obtained, that can readily be mounted to or removed from a vehicle. The track of this invention is a monolithic, non continuous one, which is composed of flexible material reinforced with a liner of nylon, canvas or the like, embedded in the track. The non-continuity with the connectable opposite end parts enables an easy mounting of the track to the vehicle wheels, for example by driving the vehicle on top of an open, depleted track, i.e. a track with the end parts not connected, until the tire-wheel assemblies are positioned at the inside of the tracks, followed by fastening the end parts together around the tire-wheel assemblies.

Suitably, the means for connecting the first and second end parts of the band comprise at least one rigid or flexible elongated member having a length corresponding to the width of the band and having a cross section adapted for passing through each hole of the first and second end part of the track. This enables a fast and easy connection of the said extremities. Thereby it is preferred that each of the holes is provided with a rigid tubing section to ensure that the passage for receiving the connecting means conserves its shape, also in circumstances where the end parts are submitted to high tension forces.

When in operation, especially when the track has to drive in heavy ground conditions, the part of the track where the first and second end part of the track are connected to each other, is subjected to high tension. By having each passage at the first and second end part of the track reinforced with a reinforcement material embedded in the track, the risk to the formation of cracks in width direction of the track as a consequence of the occurring stresses, may be minimized. It shall be understood that the occurrence of such cracks would weaken the rigidity of the track and involve the risk to breaking of the track, ensuing a serious risk to the driver of the vehicle and the people in his vicinity.

Either only one or both end parts of the track may further be provided with a rigid bush, for example a molded rigid bush, the rigid bushes of the first and second end part being made so as to engage each other. The rigid bushes can be molded in an elastomer and may for example be formed by alternating rectangular extensions and cavities. Preferably each molded extension comprises a hole for receiving a tubing section. When the first and second end parts of the track engage each other, the tubing sections form a substantially uninterrupted channel for receiving a rod, for example a steel rod, aimed at connecting and fastening the first and second end parts of the track in view of forming an endless belt around the tire-wheel assemblies of the vehicle.

According to a preferred embodiment, the first and second end part are constructed such that the loops formed by the reinforcing element are embedded in the rubber part of the track, in particular in the rubber band, whereas a first and second connecting member are mounted to respectively the first and the second end part of the track and protrude therefrom and are hingedly connectible to each other, the first and second end part comprising multiple co-operating protrusions and recesses, each protrusion comprising at a position remote from the track, a first hole for receiving a first connecting rod or tube, and a second hole proximal to the track for receiving a second connecting rod or tube, which second rod or tube is provided to extend trough the loops in cross direction of the track. The loops of the reinforcing element surround the holes at the position of the recesses.

In another embodiment of the invention, the track further comprises additional rigid or flexible reinforcing elements disposed across its length. This provides the band with an improved transverse stability, reduced risk to wearing and improved resistance to impact damages. This is important when the vehicle on which the track according to the invention is mounted has to progress in heavy and highly irregular ground conditions and a uniform distribution of the pressure exerted to the ground is aimed at.

Possibly, the flexible track according to the invention further comprises at least one intermediary piece being removable connectable at the said first and second extremities of the band in view of modifying the length of the track. This enables the said track to be adapted to nearly any configuration of wheeled vehicles.

BRIEF DESCRIPTION OF THE DRAWINGS

The invention will now be further detailed in the appending drawings and description thereof, in which:

FIG. 2a represents a perspective view of a flexible elongated reinforcing element of a track according to the invention.

FIG. 2b represents a perspective view of a loop formed by a flexible elongated element according to the invention.

FIG. 2c represents a front section view of the flexible elongated reinforcing element according to the invention.

FIG. 8c shows a detailed view to a coated guiding wing.

DETAILED DESCRIPTION

Figure 1:
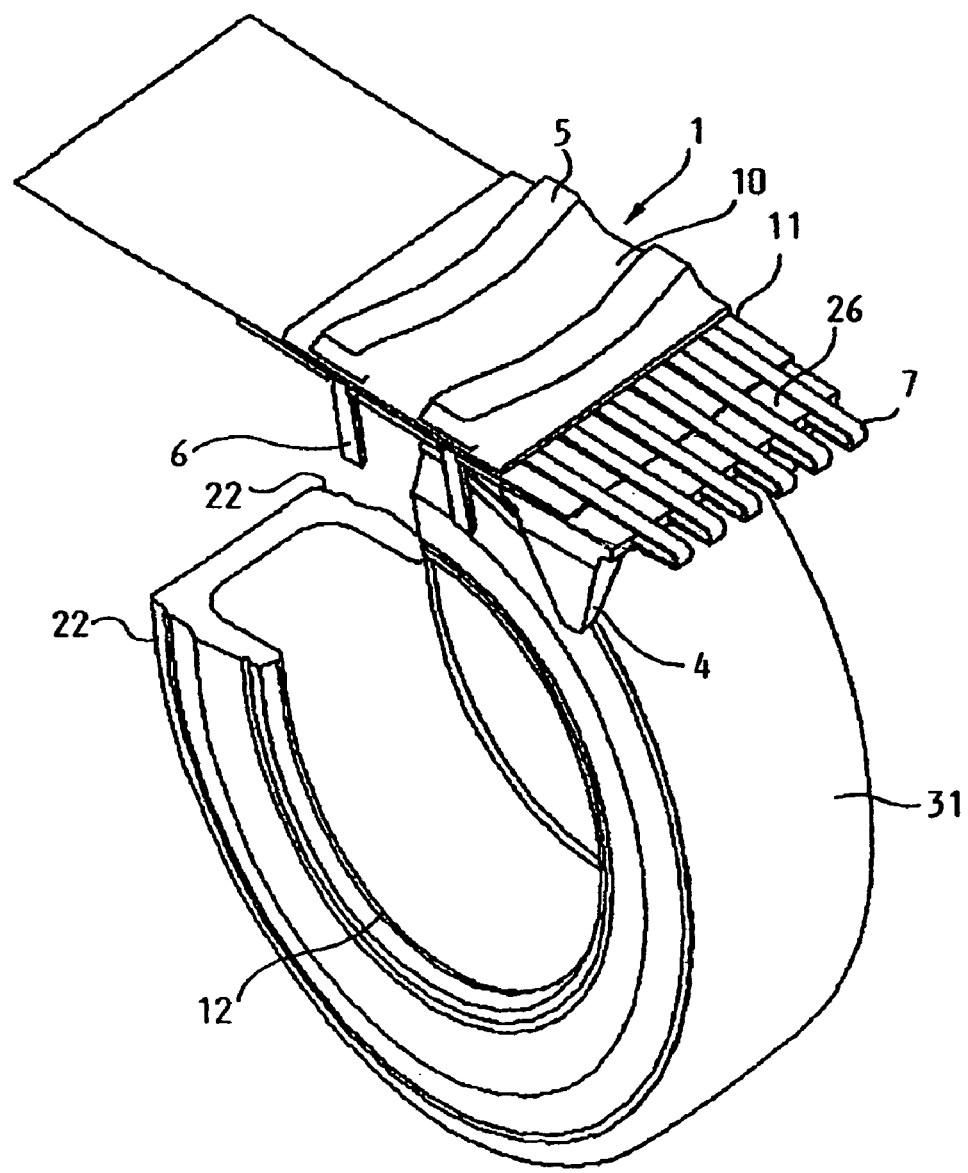
FIG. 1 represents a partially exploded perspective view of a portion of a track according to the invention mounted on a tire-wheel assembly of a vehicle.

Referring to FIG. 1, there is shown a portion of a flexible track 1 according to the invention, mounted to a tire-wheel assembly 12 of a wheeled vehicle (not shown). The track 1 comprises a band 5, the band being made of a flexible material. The band 5 may be made of any suitable flexible material known to the person skilled in the art, but is preferably made of a plastic material, preferably an elastomeric material.

As is shown in more detail in FIGS. 4, 5a and 5b, 7, 8a, 8b and 9, the track 1, in particular the band 5 comprises an inner circumferential surface 3 running along the circumference of the band, the inner surface 3 forming a contact surface between the band 5 or track 1 and the tire-wheel assembly 12 and providing a running surface for the wheels 12. The inner surface 3 is provided to contact the running surface 31 of the tires. The track 1, in particular the band 5 also comprises an outer circumferential surface 10, which is provided to contact the medium over which the track 1 is to be displaced.

Conversion of a wheeled vehicle into a tracked vehicle is in particular done in circumstances where there is a need
1) to decrease the local pressure exerted by the vehicle to the soil and,
2) to have the ground pressure exerted by the track as uniform as possible, in order to minimize soil compaction
3) to increase the traction capabilities
4) to increase the vehicle stability.

Figure 9:
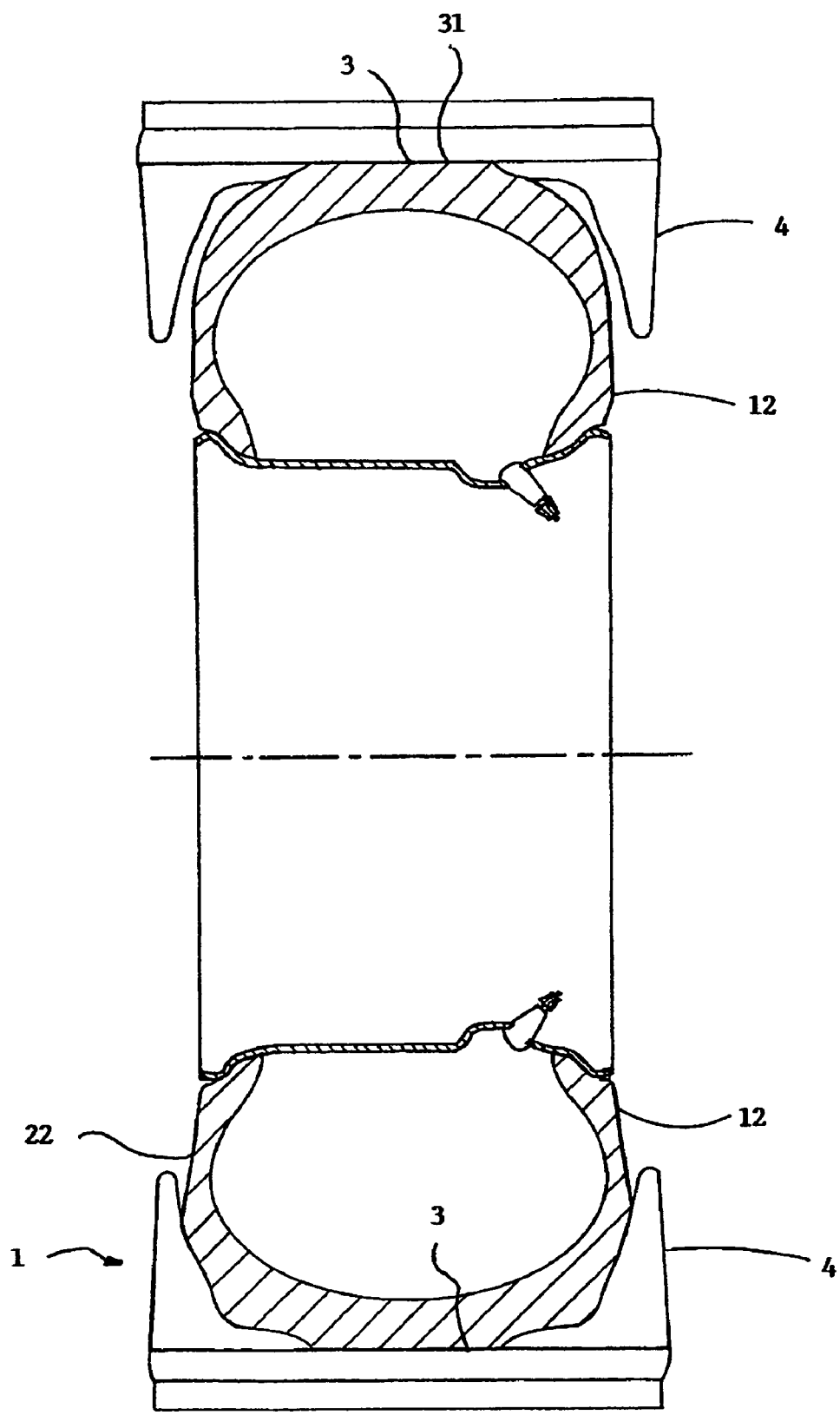
FIG. 9 shows a cross section of a tire-wheel assembly mounted to the track of this invention showing the side-wall bulging under load.

Along opposite longitudinal, circumferentially extending sides of the band or track 1, a plurality of guiding wings 4 is provided which are spaced apart in circumferential direction of the track. The guiding wings 4 protrude from the inner face 3 of the band 5, i.e. the side facing the wheels, towards the central space enclosed by the track 1 or in other words towards the tire-wheel assemblies 12 of the vehicle to which the track of the present invention is to be mounted. Consecutive pairs of opposite guiding wings 4 form a channel 15 for receiving the tire-wheel assemblies. From FIG. 7 and in particular from FIG. 9 it can be seen that the part of an inflated tire 12 supported by a supporting surface, i.e. the loaded part of the tire 35, shows a varying width over the cross section of the tire 12. Thereby, the sidewall of the part of the tire 12 resting on the supporting surface (see FIG. 7) bulges out or expands in width direction of the tire when loaded. This bulging has the consequence that the expanded part of the tire gets clamped between consecutive opposite guiding wings 4. In that way contact is established between the side wall of the tire and the track, the bulging resulting in transmittal of power through friction. The upper part of FIG. 9 shows the non-loaded, mostly top part of a tire 36.

Opposite guiding wings 4 are disposed on a distance d from each other which is chosen as described below, in particular such that
 d is larger than the width of the tire-wheel assembly when not loaded 36 or not supported on the running surface 3 of the track to facilitate positioning of the tire-wheel assembly;
 d is smaller than the width of the tire-wheel assembly when supported or loaded 36, such that opposite sides of the expanded part of the tire 12 are clamped between opposite guiding wings 4. The guiding wings 4 are provided to exert a clamping action to opposite sides 22 or side faces of the tires 12, in cross direction of the tire-wheel assembly. The clamping action in cross direction of the tire-wheel assembly ensures transfer of driving forces between the wheels and the track, it involves an improved grip of the track to the wheels and a consequently reduced risk to slipping of the wheels with respect to the track in extreme circumstances of use. The driving of the track by exerting a clamping action in cross direction of the wheels has further been found to reduce the sensitivity of the driving part of the vehicle to wearing, as well as the risk to wearing of the running surface 31 of the tires. The optimized contact surface between the tire-wheel assembly and the track 1 contributes to this effect. An optimum grip of the track 1 to the tire-wheel assembly 12 may be achieved with a channel 30 having a truncated conical shape, with a width increasing from the inner circumferential track surface 3 towards a top 32 of the guiding wings 4.

Because of the sideways engagement of the guiding wings 4 and tire-wheel assembly 12 and the clamping force exerted by the guiding wings 4 to the tire-wheel assembly 12, transfer of driving forces between the track 1 of the present invention and the tire-wheel assembly 12 may take place through or along the sides of the tire-wheel assembly without the need to provide circumferential tension in the track 1. As a consequence traction transfer between tire-wheel assemblies 12 and track 1 is virtually independent of the circumferential tension of the track and traction transfer may even take place in case the track is not tensioned around the tire-wheel assembly but is sagging somewhat. As a consequence also there will only be a limited need to adapt the length of the track to the size of the wheels and to the distance between the front and the back wheels. As a further consequence, the dependency of the transfer of traction between track and wheels to the size of the tire-wheel assemblies of the vehicle, the loading of the vehicle, the tire pressure, traveling speed and wearing of the tire, will be limited. This is important as it permits achieving optimum transfer of traction forces even with varying dimensions of the tires of wheeled vehicles, without the need to repeatedly adjust the circumferential tension of the track. The absence of the need to subject the tire-wheel assemblies to a circumferential tension exerted by the track further allows to reduce the loads exerted to the parts connecting the end parts of the track and the risk to a break down thereof, the traction transfer being virtually independent of the circumferential tension to which the track is subjected.

The inventors have further observed a reduced risk to slipping of the wheels with respect to the track, even in case little or no circumferential tension is exerted by the track, where the track showed some sagging, as well as in severe circumstances with heavy grounds. The inventors have also observed that there is a reduced risk to de-tracking of the track from the wheels when the track is driven in extreme conditions. The inventors have attributed those and the aforementioned advantages to the fact that transfer of traction is induced by clamping forces which act in a direction perpendicular to the direction in which the track runs or is displaced and perpendicular to any resistance exerted to the track by the ground over which the track is to be displaced. However the angle between both may be somewhat larger or smaller than 90°, e.g. 80° or 100°, even 60 or 120°. By mounting a track 1 around the tire-wheel assemblies 12 the pressure exerted by the vehicle to the ground may be reduced in a more or less uniform manner, as a consequence of which the risk to exerting a too high local pressure by the vehicle may be minimized. Furthermore, an improved ground contact and an improved contact floor pressure have been observed, especially in case rubber tracks are used which are substantially free of holes. These improvements are important as the tracks of this invention are meant to be used on and to be displaced over muddy grounds where there is a risk to sinking into the ground when loaded, on sandy grounds, on steep slopes or on rocky surfaces. Besides being capable of moving over such grounds, the vehicle must further be capable of picking up, moving and carrying loads, which puts high demands to the ground pressure exerted by the vehicle. With the track of this invention, a strongly reduced-risk to toppling over of the vehicle during use has been found.

The distance between consecutive or adjacent guiding wings 4 on one and the same longitudinal side of the track 1, the shape and height of the guiding wings and the positioning along the opposite sides of the band or track is not critical to the invention and will be adapted by the person skilled in the art depending on the intended use of the flexible track 1.

In the track of the present invention, the guiding wings 4 may be made of any suitable material known to the person skilled in the art, but are preferably made of the same material as the band 5. Preferably the guiding wings are at least partly made of a plastic material, preferably a thermoplastic material. The guiding wings 4 are provided to engage opposite lateral sides 22 of the tires of a vehicle to which the track is mounted and to exert a clamping force to the said sides 22 in view of clamping the expanded part between them.

Depending on the circumstances in which the track is to be used, each or part of the guiding wings 4 may be reinforced with a rigid core 6, a semi rigid or a flexible core 6. In that case the core will be coated with a plastic material to form the guiding wing as is shown in FIG. 8. Suitable coating materials having a low friction coefficient include plastic materials for example polyurethane, Teflon, composite materials, thermosetting resins, steel and any other material considered suitable by the person skilled in the art. As can be seen from FIG. 8c, the coating may take the shape of a shoe. However a rigid core, which may flex in cross direction of the track 1 is preferred as this facilitates insertion of the wheels 12 in the channel 30. Thereby the material of the core is preferable chosen such that flexing in response to expansion of the part of the tire 12 contacting the guiding wing 4 is limited as this would result in reduced clamping by the guiding wings. The core 6 may be made of any suitable material known to the man skilled in the art, for example a thermoplastic or thermosetting resin, a fiber reinforced composite material, a metal part, although the use of steel, in particular spring steel, is preferred as it combines good rigidity with some flexibility and the property of returning to its original position after having been somewhat stretched. The rigid core 6 will usually comprise (a) a first base part 26 which extends in cross direction of the track and in use runs parallel with the running surface of the track 1, and (b) two portions 27 extending in upright position, preferably substantially vertical with respect to the base part 26, although the angle may be smaller than 90° if higher clamping forces are aimed at, or somewhat larger than 90° if clamping forces may be reduced.

The inner face 28 of the guiding wings 4 facing the tire-wheel assemblies, preferably contains at least one, but preferably multiple protrusions, for example profiles or patterns, which protrude from the inner side in cross direction of the track 1, i.e. the direction of the wheels 12. This is done to improve grip of the track 1 to the tire-wheel assemblies 12 and to reduce the risk to building of frictional heat in the wings 4.

According to a preferred embodiment of the invention, the number, shape and geometry of the protrusions is adapted to the deformation of the tire when subjected to a load. In particular, the use of a low friction material as a coating for the guiding wings is preferred to reduce the risk to the building of excess frictional heat. Furthermore also the outer face 29 of the guiding wings 4 may comprise one or a plurality of protrusions, for example profiles or patterns protruding from the outer face in cross direction of the track 1 or in any other direction, with the aim of improving the grip of the wings 4 to the ground over which the track 1 is displaced. This may particularly be important with heavy grounds. The number and shape of the profiles is not critical to the invention and will usually be determined by the man skilled in the art taking account of the intended use of the track 1.

Figure 7:
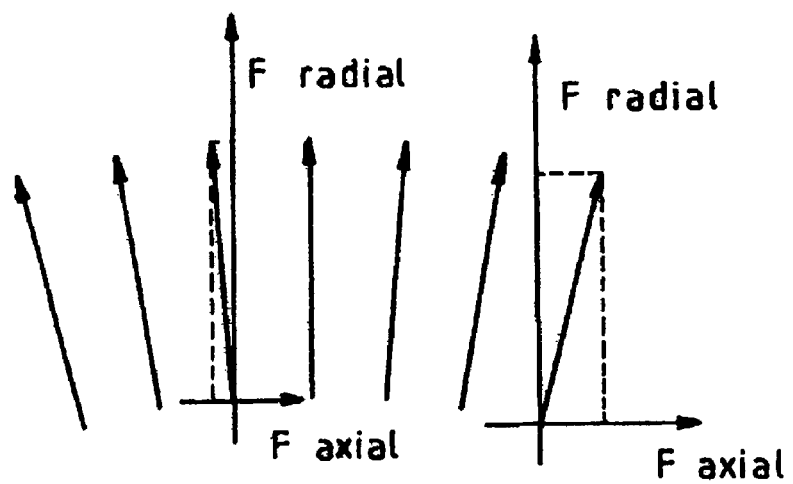
FIG. 7 shows forces arising in a tire-wheel assembly contained in a track of this invention.
Figure 7:
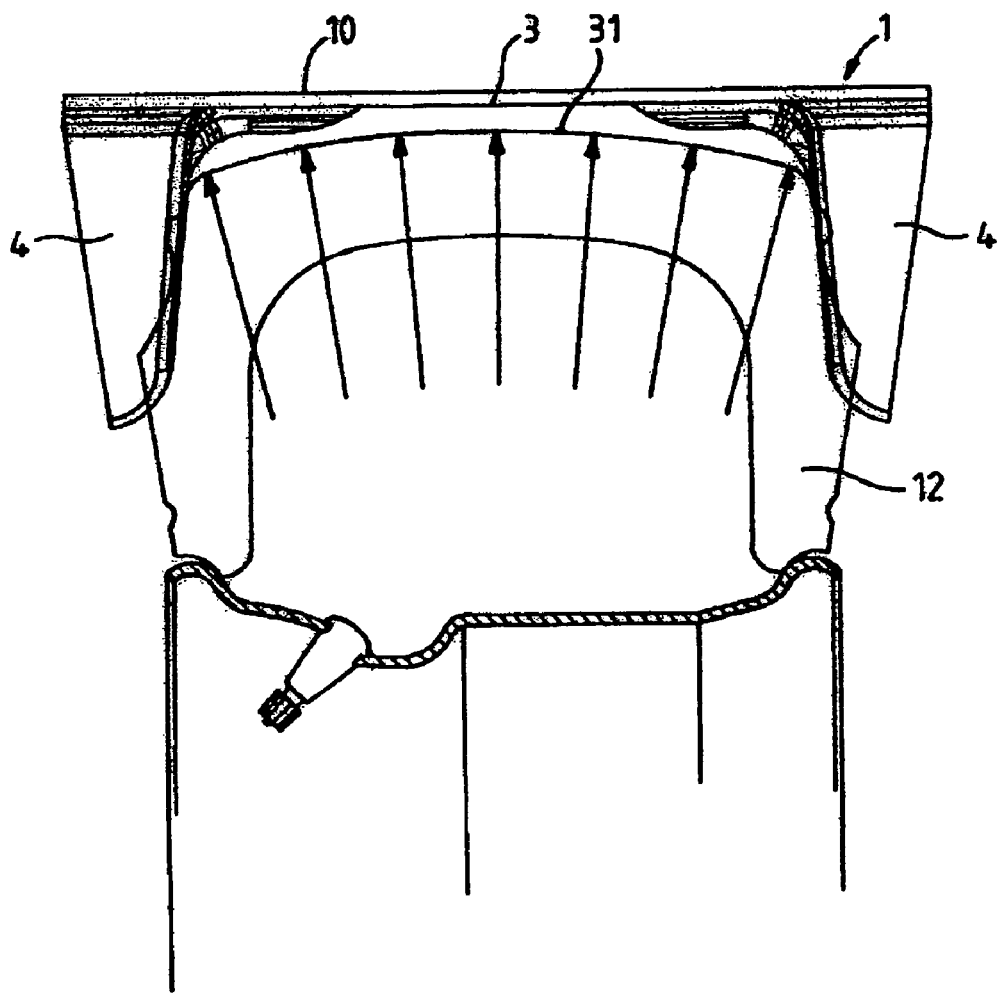
Figure 8A:
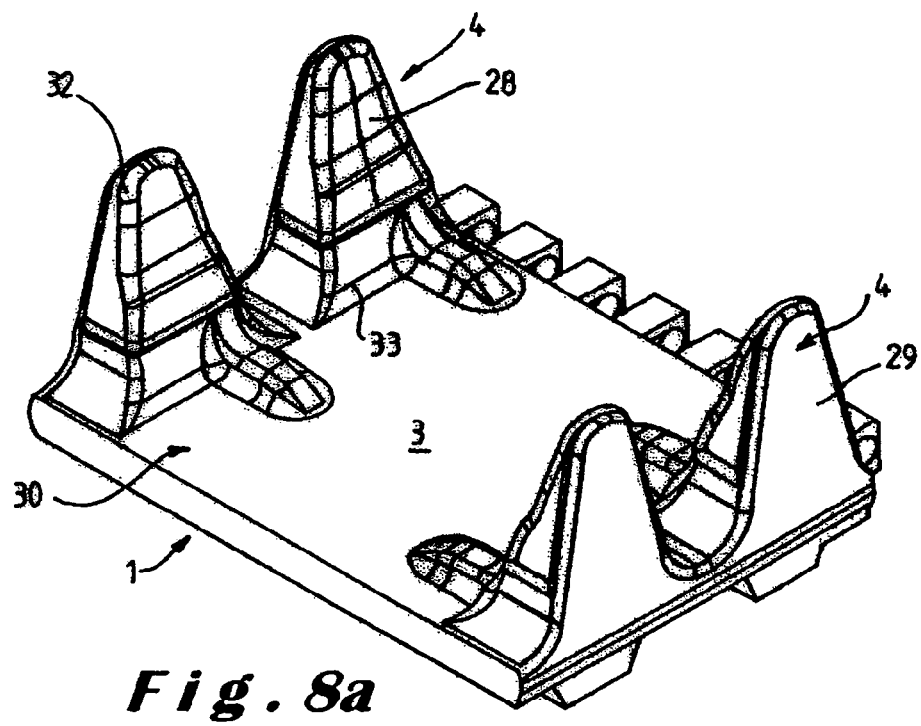
FIG. 8a shows a detailed view to the guiding wings mounted to the flexible track of this invention.
Figure 8B:
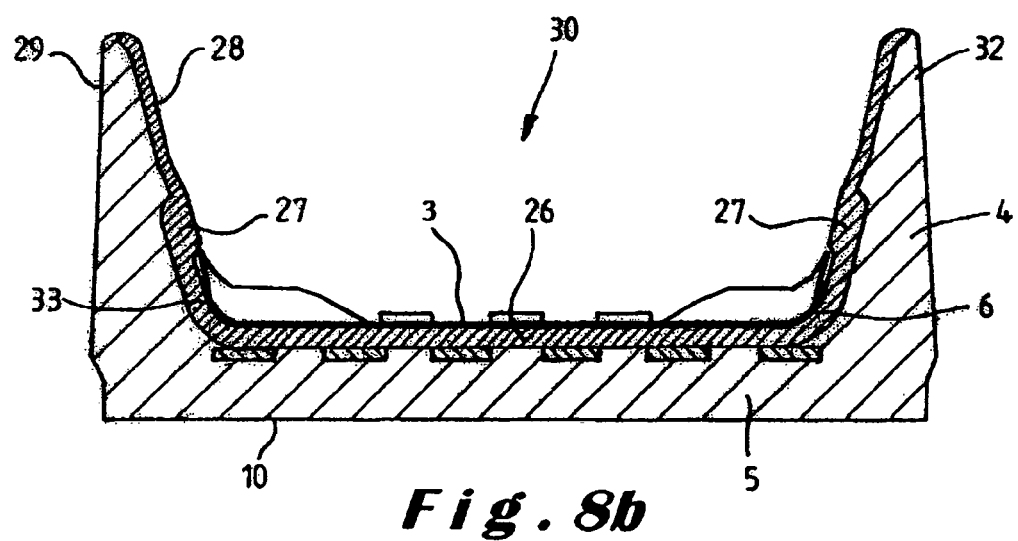
FIG. 8b shows the mounted guiding wings in cross section.

Within the scope of the present invention it is further preferred that the shape of the guiding wings is adapted to facilitate and guide running of the tire-wheel assemblies 1 within the channel 30, as is shown in FIG. 7. Thereto, the guiding wings 4 will usually have a larger width at the bottom 33 at the connection with the band 5, and a smaller width at the top 32. Preferably the top 32 of the guiding wings will be rounded, the inner face 28 of the guiding wings slanting towards the inner surface of the track 1 to provide a channel 30 having a conical shape. A thus shaped track 1 has a wide opening at the top facilitating insertion of the tire-wheel assemblies. The conical shape of the channel guides and controls displacement of the wheels over the track once inserted. The round top 32 of the guiding wings reduces the risk to damaging the wheels when running over the track.

The guiding wings 4 can be used as such as the single means for transferring traction forces between the tire-wheel assemblies and the track, or in combination with traction ribs provided on the inner surface 3 of the band facing the wheels 12. When used alone, guiding wings 4 enable any kind of design of the tires to be used, provided the width of the tire-wheel assemblies is adapted to the track. Traction ribs could either be used as universal additional traction elements allowing occasional positive interference when slipping occurs. The shape, number and position of the traction ribs will be determined by the man skilled in the art taking account of the specific tire design, so as to guarantee optimum male/female engagement.

Figure 5A:
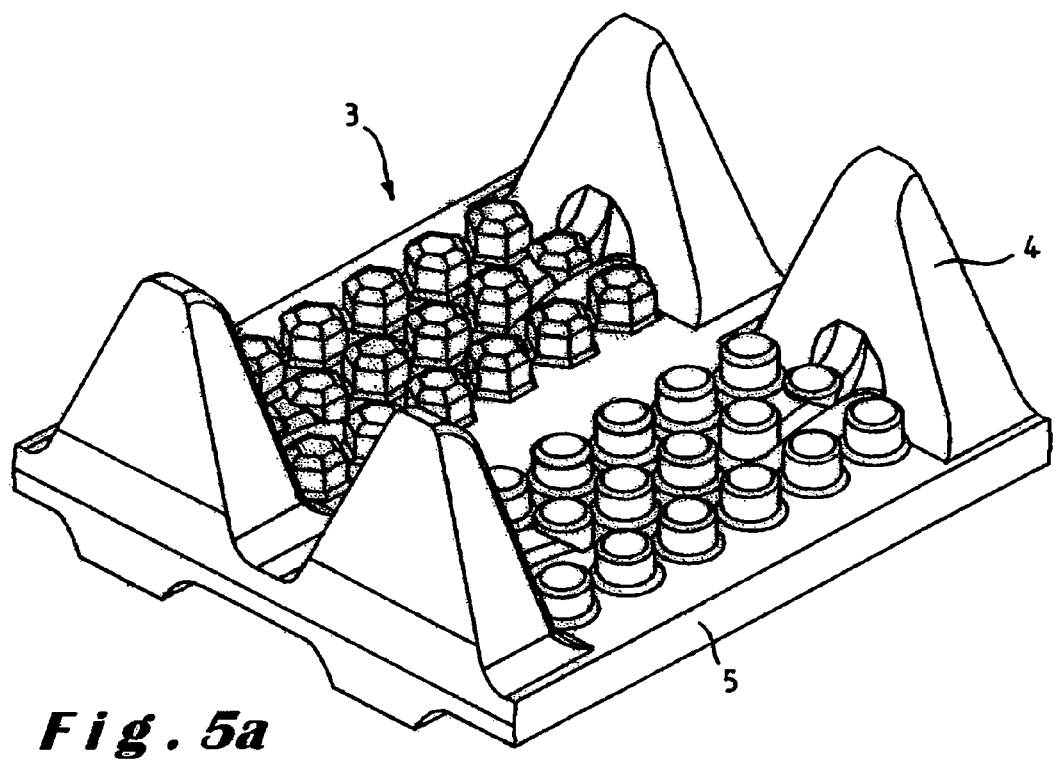
FIGS. 5a and 5b are preferred embodiments of the inner surface of the track of this invention.
Figure 5B:
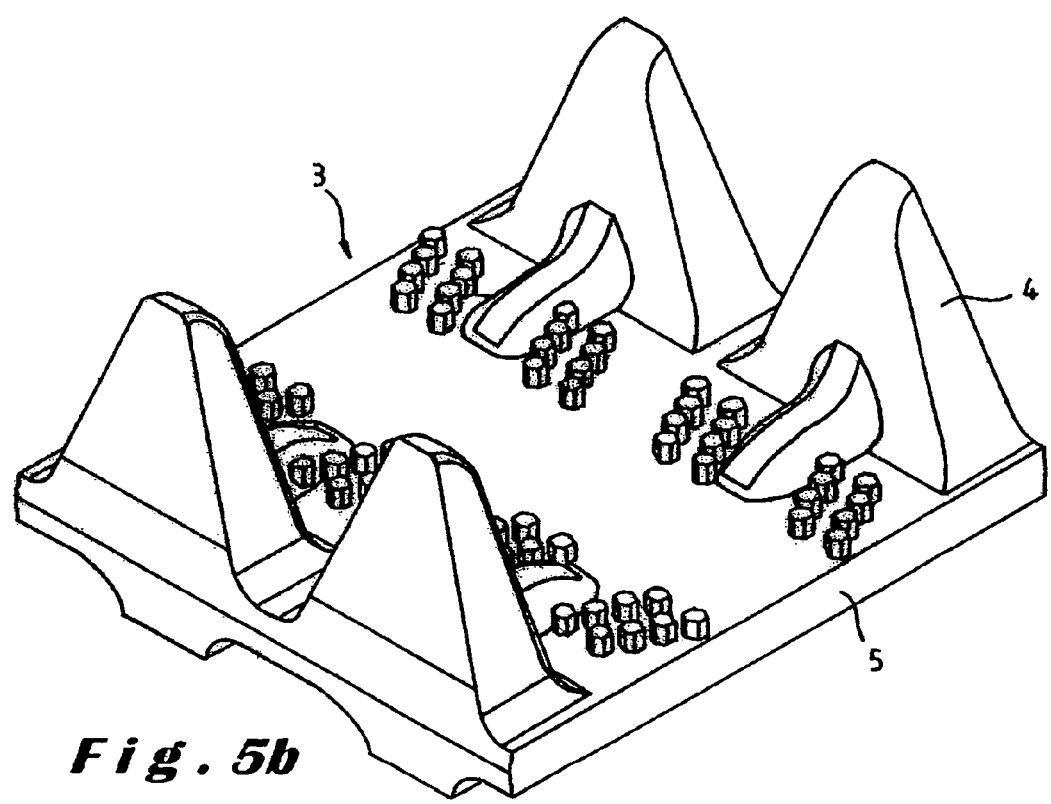

As can be seen from FIGS. 5a and 5b, besides or instead of traction ribs, the inner surface 3 of the band 5 may be profiled so as to improve engagement between band 5 and tire-wheel assemblies if necessary.

Figure 6A:
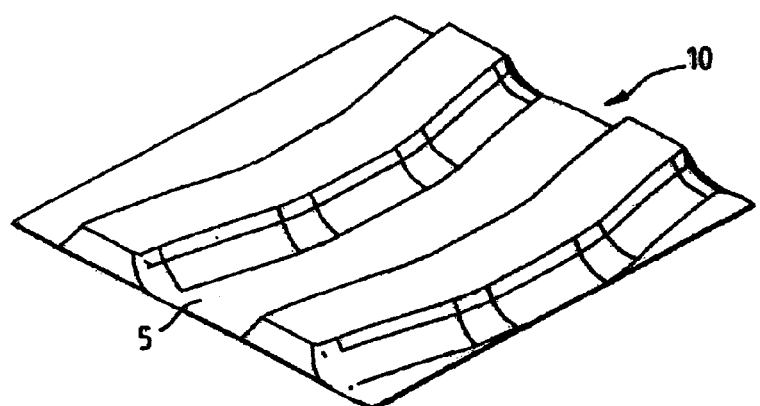
FIGS. 6a and 6b show preferred embodiments of the outer side of the track of this invention.
Figure 6B:
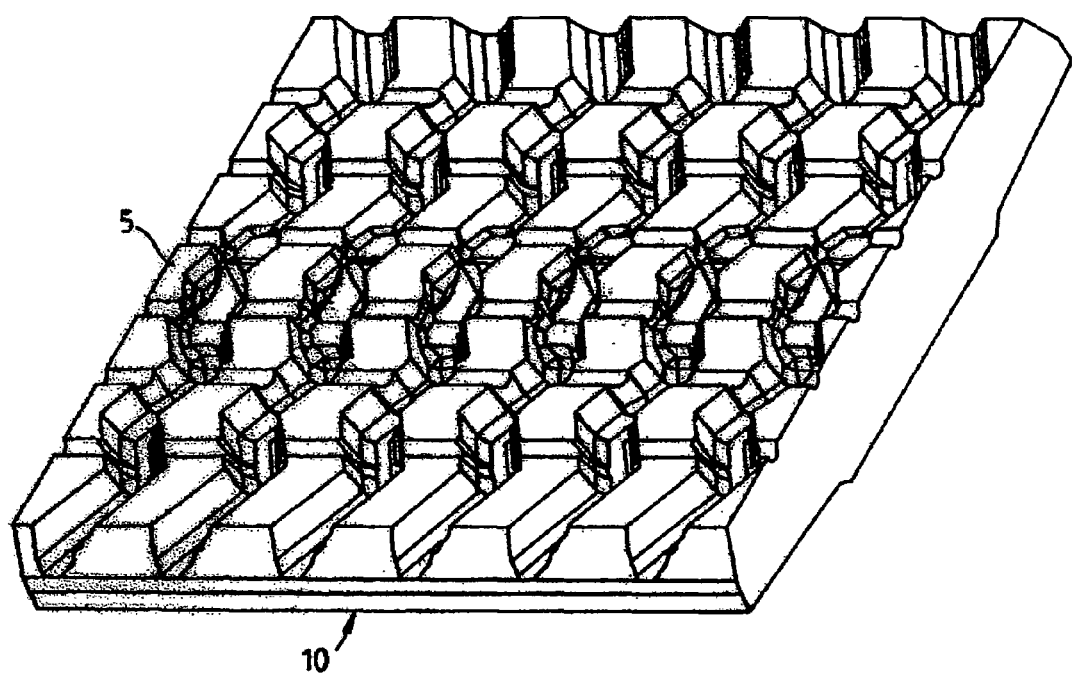

To improve ground contact, minimize the risk to slipping or sinking into muddy grounds and facilitate displacement over steep slopes with loose grounds, the band may comprise a profiled outer face 10 (FIGS. 6a and 6b). The shape of the profiles may be optimized to any type of application or ground condition. The outer face 10 may further comprise at least one transversal lug made of rigid material, angled lug, bended lug, diamond or block pattern, slick, embedded in, bolt on or fixed to the track, with the aim of improving the grip to the ground or reinforcing the band and increasing its lifetime.

According to a preferred embodiment of the invention at least one reinforcing element 7 may be embedded into the material of the band 5. The reinforcing element 7 may be made of any suitable material known to the person skilled in the art, and may for example be made of a steel cord strip or a plurality of adjacent strips of such material embedded in an elastomeric material coating. Other suitable materials include strands, tows, yarns or fabric strips of fibers of a reinforcing material, comprising for example mineral fibers, metal fibers, synthetic polymer fibers for example polyester fibers, for example aramid fibers. It is however also possible to combine reinforcing elements made of different materials. The reinforcing element 7 extends along the length of the track 1, in longitudinal direction thereof. The track 1 may further comprise a single or a plurality of flexible reinforcing elements 11 extending from a first longitudinal side of the band to a second longitudinal side of the band 5. This reinforcing element provides a protection shield against puncture and damage from outside bodies and implies the desired longitudinal stiffening to the track.

Figure 3:
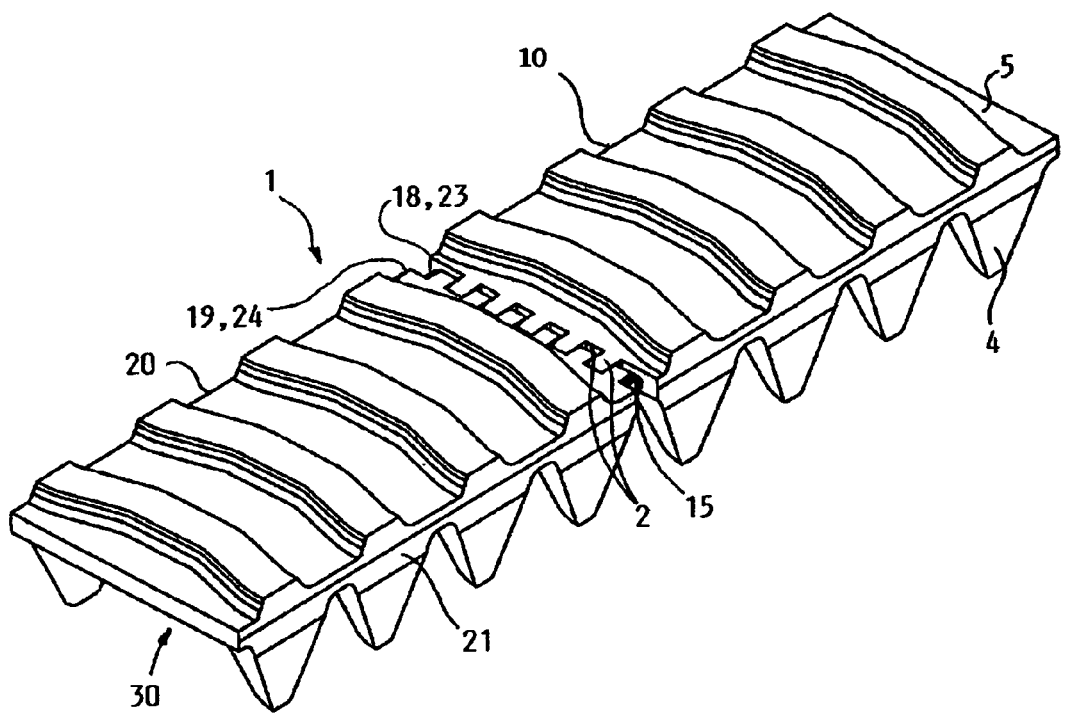
FIG. 3 represents a perspective view of a portion of a track according to the invention in a position in which the extremities of the band of the track are connected.

The flexible elongated reinforcing element 7 is shown in detail in FIG. 2a. The reinforcing element 7 shown consists of a steel cord coated with a layer of an elastomeric material although other materials may also be used. The thus coated reinforcing element 7 is embedded in the material of the band 5 (not shown) of the flexible track 1. The flexible elongated reinforcing element 7 extends continuously from one lateral or longitudinal side of the band to the opposite lateral side. This is achieved in that a first end part of reinforcing element 7 extends from the first end part 18 of the track towards the opposite second end part 19 of the track, makes a loop 45 around the second end part 19 and returns to the first end part 18 to make another loop around the first end part 18. In that way the reinforcing element 7 makes alternating loops 45 around the first 18 and second end part 19. Preferably these loops extend around rigid tubing sections 9, which delimit holes 14, provided at the end parts of the band. The holes 14 extend in cross direction of the band for forming a passage for receiving connecting means (not shown) for connecting the first and second end part of the band as shown in FIG. 3.

Figure 10:
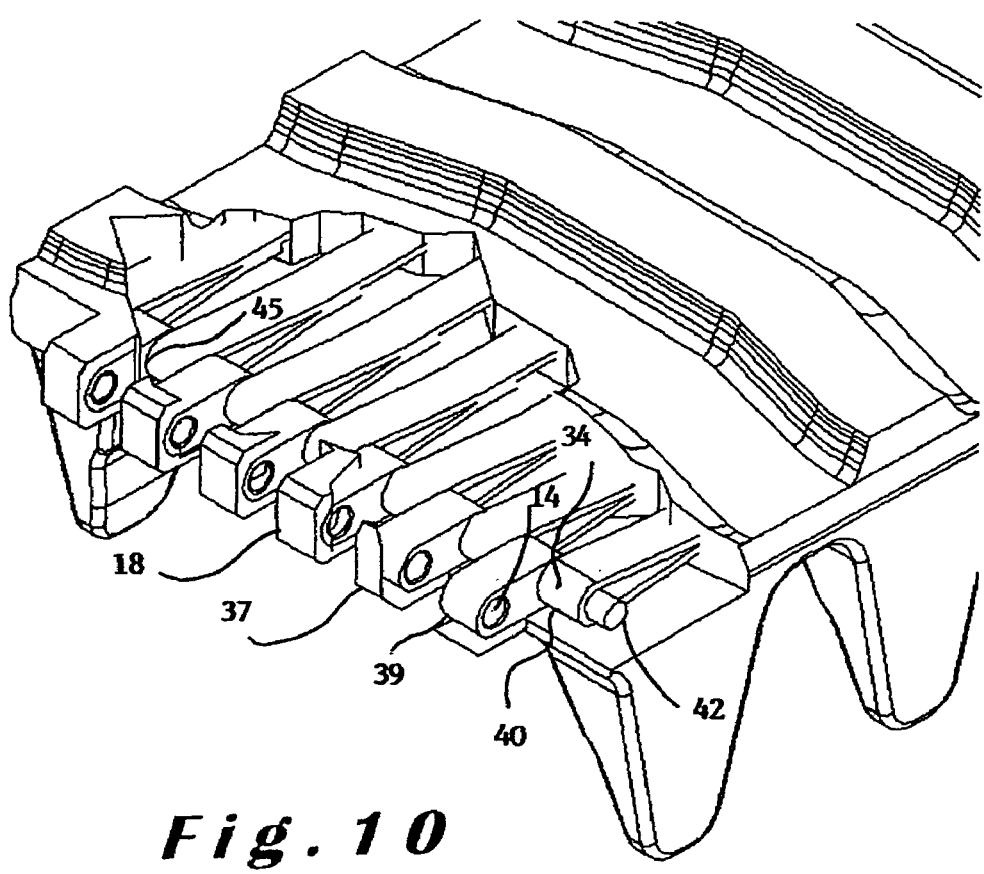
FIG. 10 shows a perspective view to an alternative embodiment of the end portion of a track according to the invention.

However, it is also possible as is shown in FIG. 10 that the reinforcing element 7 returns in opposite direction to form a loop, in front of the connecting part 18, 19. According to this preferred embodiment, a first and second connecting member 37 are mounted to respectively the first and the second end part 18, 19 of the track 1 and protrude therefrom. The first and second connecting member 37 are hingedly connectible to each other. The first and second connecting member 37 comprise multiple co-operating protrusions 39 and recesses 40, each protrusion 39 comprising a first hole 14 at a position remote from the track for receiving a first connecting rod or tube 41, and a second hole 34 proximal to the track for receiving a second connecting rod or tube. The loops 45 formed by the reinforcing element are embedded in the rubber part of the track at the position of the recesses 40, the second rod or tube is provided to extend trough the loops 45 and the second holes 34 in cross direction of the track 1. In that way a flexible track is obtained in which the at least one flexible elongated reinforcing element 7 is embedded in the band, the at least one reinforcing element 7 forming a loop at the first and second end part 18, 19 of the track, first connecting members being mounted to a first end part of the loop, second connecting members being mounted to a second end part of the loop. Or in other words a flexible track is provided in which the reinforcing element does not run around the connecting member, but is embedded in the bottom of the track.

The reinforcing element 7 may be made of a wide variety of materials, for example metal, textile, a plastic material, mineral fibers, metal fibers, synthetic polymer fibers for example polyester fibers, for example, or aramid fibers, or a combination of reinforcing elements made of different materials preferably embedded in an elastomeric material coating 17, cord or strip or a plurality of adjacent strips of such material embedded in an elastomeric material coating. The reinforcing element 7 will usually take the form of a cord, a strip, strands, tows, yarns or fabric strips of fibers of reinforcing material. The band 5 will usually comprise a plurality of rigid or flexible reinforcing elements 11 disposed across the length of the band, although a single one may also be used.

As can be seen from FIG. 2a the end parts 8 of the reinforcing element 7 are secured 25 to the reinforcing element 7 to form the loop 45 and to provide for a transfer of stresses from the end part to the bulk of the reinforcing element.

FIG. 2b shows a detail of a loop made by the flexible elongated reinforcing element 7 around a rigid tubing section 9 delimiting a hole for the passage of a means (not shown) for connecting the extremities of the band (not shown).

FIG. 2c shows in front section a the flexible elongated reinforcing element 7 comprising a strip of a plurality of steel cords 16 embedded in an elastomeric material coating 17.

FIG. 3 shows a portion of a flexible track 1 according to the invention comprising a band 5 of elastomeric material, as well as the first and second end part 18, 19 connected to each other. As can be seen from FIG. 3, each of the first and second end part 18, 19 comprises a plurality of alternating extensions and recesses 2. Each extension of the first end part 18 engages a corresponding recess of the second end part 19. Each extension 2 is provided with a hole in which a tubing section 9 is mounted (not shown), such that that tubing sections of successive extensions form a channel 15 in cross direction of the band for receiving connecting means (not shown) for connecting the end parts of the band 5. It is preferred that the first and second end part 18, 19 of the band 5 are hingingly connectable to each other.

Figure 4:
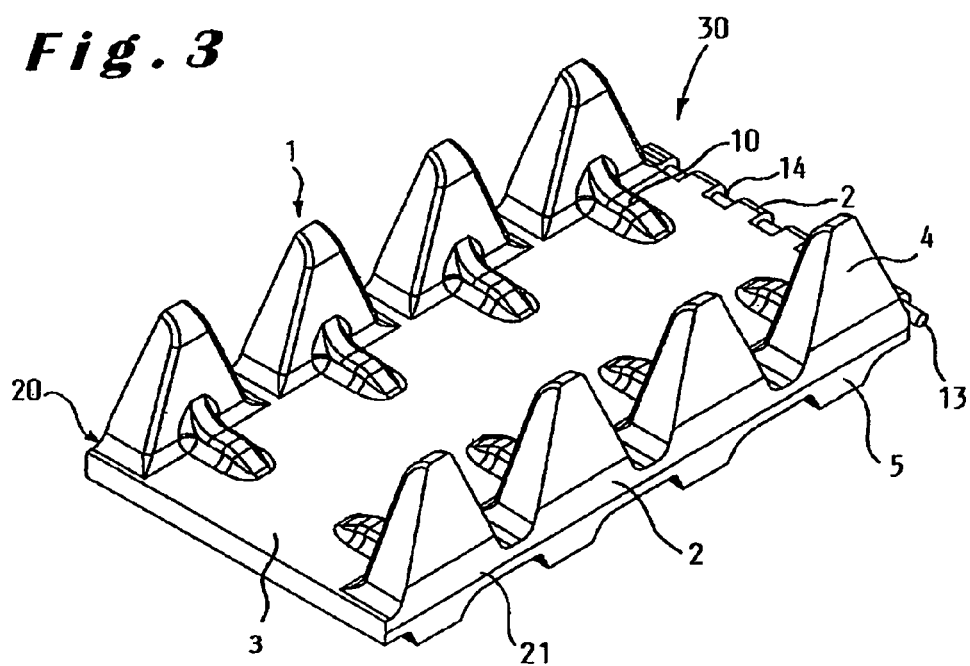
FIG. 4 represents a top view of a portion of a track according to the invention.

FIG. 4 shows a portion of a flexible track 1 according to the invention, comprising a flexible band of an elastomeric material 5 having guiding wings 4 and tractions ribs disposed at the inner circumferential surface 3 of the band 5 which is provided to contact the running surface of the tire-wheel assemblies of a vehicle on which the track is to be mounted. Shown on the figure is an end part 18, 19 of the track 1 provided with alternating extensions and recesses 2, each of the said extensions having a hole 14 delimited therein in cross direction of the length of the band for forming a passage 15 for receiving a means 13 for connecting the extremities of the band 5 when the track is mounted on tire-wheel assemblies of a vehicle, the said means 13 consisting in a rigid elongated element.

The inventors have observed that flexible track of the present invention provides an optimum discharge of stones and parts accidentally ending up in the space between the running surface of the tire-wheel assembly 12 and the track 1 during use. This phenomenon can be explained by the fact that due to the low circumferential tension exerted by the band, the tire 12 at the position of the non loaded part of the tire-wheel assembly maintains its substantially circular cross sectional shape. The presence of a crowning on the running surface 31 of the tires combined with a predominantly square and flat inner surface 3 of the track 1 creates vectorial forces in the running surface 31 of the tire-wheel assemblies, which are directed to the outside of the track 1, causing stones and other debris to move outwards (see FIG. 7). As can be seen from FIG. 7 the radial component of these vectorial forces reduces towards the outside while the axial one increases.

If it is desired to temporarily increase the length of the track 1 of the present invention, an intermediary piece may be connected to the first and second end part. The way in which the intermediary piece is constructed is not critical to the invention and will be adapted by the person skilled in the art to the intended use of the track 1.

The present invention also relates to a vehicle having the above-described flexible track mounted at least two successive tire-wheel assemblies of the vehicle, taken in movement direction of the vehicle.

The invention claimed is:

1. A unitary flexible track for use in combination with wheel assemblies converting a wheeled vehicle into a tracked vehicle, the track mounted in a longitudinal direction around at least two successive vehicle tire-wheel assemblies in movement direction of the vehicle, the track comprising a band of flexible material, the track having an inner circumferential track surface provided to form a running surface for the wheels and an outer circumferential surface provided to form a running surface for the track with respect to the medium over which the track is to be displaced, the track also having a first and a second end part extending in cross direction thereof, the first and second end parts each comprising mutually co-operating connecting means for connecting the first end part to the second end part to form an endless track, each tire-wheel assembly having a circumferential running surface provided to contact the inner circumferential track surface, each tire-wheel assembly comprising a loaded wheel part having a contact surface resting on the inner circumferential track surface and a non-loaded wheel part not resting on the inner circumferential track surface, characterized in that the track comprises a plurality of spaced apart guiding wings disposed along opposite longitudinal sides of the track and protruding inwardly from the inner surface of the track so as to form on the track an inner circumferential channel for receiving the tire-wheel assemblies, the guiding wings engaging opposite lateral sides of the loaded part of the tire-wheel assembly and to exert a clamping force thereto in the cross direction of the track and the tire-wheel assembly to transfer a driving force between the tire-wheel assembly and the track, opposite guiding wings being positioned at a distance from each other which is smaller than the width of the tire-wheel assembly when loaded and which is larger than the width of the tire-wheel assembly when not loaded.

2. A flexible track as claimed in claim 1, characterized in that at least part of the guiding wings is reinforced with a rigid core, the rigid core flexing with respect to the band.

3. A flexible track as claimed in claim 2, characterized in that the rigid core is made of a fibrous reinforced composite material, of steel or of spring steel.

4. A flexible track as claimed in claim 1, characterized in that an inner face of at least part of the guiding wings forming the contact surface with the lateral sides of the wheels is provided with profiles protruding from the inner face of the guiding wings toward the wheels to improve the grip to the wheels and to minimize the risk to building of frictional heat.

5. A flexible track as claimed in claim 1, characterized in that the guiding wings are at least partly made of or covered with a low friction material, selected from the group consisting of rubber, plastic and steel.

6. A flexible track according to claim 1, characterized in that at least part of the guiding wings have an outer face opposite an inner face, the outer face being provided with profiles protruding there from to improve grip of the band to the ground contacting the guiding wings.

7. A flexible track as claimed in claim 1, characterized in that the channel has a truncated conical shape, with a width increasing from the inner circumferential track surface towards a top of the guiding wings.

8. A flexible track as claimed in claim 1, characterized in that at least part of the guiding wings have a rounded top.

9. A flexible track as claimed in claim 1, characterized in that the first and second end part of the band are hingingly connectable to each other.

10. A flexible track as claimed in claim 1, characterized in that each of the first and second end parts of the band are provided with alternating extensions and recesses, each extension comprising at least one hole and engaging a corresponding recess of the second end part, each extension of the second end part engaging a corresponding recess of the first end part, so as to form across the width of the band a passage with a plurality of successive holes for receiving a connecting means for connecting the said first end part to the second end part of the band.

11. A flexible track as claimed in claim 10, characterized in that each hole is provided with a rigid tubing section.

12. A flexible track as claimed in claim 1, characterized in that at least one flexible elongated reinforcing element is embedded in the band, the at least one reinforcing element forming a loop around each of the first and second end part of the track.

13. A flexible track as claimed in claim 10, characterized in that a first and second connecting member are mounted to respectively the first and the second end part of the track and protrude therefrom and are hingedly connectible to each other, the first and second end part comprising multiple co-operating protrusions and recesses, each protrusion comprising a first hole at a position remote from the track for receiving a first connecting rod or tube, and a second hole proximal to the track for receiving a second connecting rod or tube, in that the loops formed by a reinforcing element are embedded in the rubber part of the track at the position of the recesses and form a loop around at least one of the said recesses, in that the second rod or tube is provided to extend trough the loops and the second holes in cross direction of the track.

14. A flexible track as claimed in claim 12, characterized in that the band comprises opposite first and second transversal sides, in that each reinforcing element extends continuously from one transversal side of the said band to the opposite transversal side of the said band in making alternating loops around at least one hole of each of the first and second end part of the track.

15. A flexible track as claimed in claim 11, characterized in that each reinforcing element comprises a first and a second end part, each of the end parts being secured to the reinforcing element to form a loop.

16. A flexible track as claimed according in claim 12, characterized in that the reinforcing element is made of metal, textile, a plastic material, mineral fibers, metal fibers, synthetic polymer fibers, polyester fibers, aramid fibers, or a combination of reinforcing elements made of different materials preferably embedded in an elastomeric material coating, cord or strip or a plurality of adjacent strips of such material embedded in an elastomeric material coating.

17. A flexible track according to claim 1, characterized in that the band comprises a plurality of rigid or flexible reinforcing elements disposed across the length of the band.

18. A flexible track according to claim 1, characterized in that the band comprises an inner face provided to contact the vehicle wheels, the inner face being provided with at least one traction rib, the at least one traction rib engaging corresponding recesses in the vehicle wheels.

19. A flexible track according to claim 1, characterized in that the band comprises an inner face provided to contact the vehicle wheels, the inner face being provided with a plurality of protrusions protruding towards the wheels.

20. A flexible track according to claim 1, characterized in that the band comprises an outer face, the outer face comprising a plurality of protrusions protruding there from.

21. A flexible track as claimed in claim 20, characterized in that the outer face of the track comprises at least one transversal lug, angled lug, bended lug, diamond or block pattern made of rigid material.

22. A vehicle comprising a flexible track as claimed in claim 1 mounted in longitudinal direction of the track around at least two successive tire-wheel assemblies of the vehicle, taken in the movement direction of the vehicle.

23. A flexible track as claimed in claim 13, characterized in that the band comprises opposite first and second transversal sides, in that each reinforcing element extends continuously from one transversal side of the said band to the opposite transversal side of the said band in making alternating loops around at least one hole of each of the first and second end part of the track.

24. A flexible track as claimed in claim 14, characterized in that each reinforcing element comprises a first and a second end part, each of the end parts being secured to the reinforcing element to form a loop.

* * * * *